United States Patent [19]

Rice

[11] 4,383,785

[45] May 17, 1983

[54] METHOD FOR MILLING AND DRILLING GLASS

[75] Inventor: Stephen H. Rice, Waldorf, Md.

[73] Assignee: The United States of America as represented by the Administrator of the National Aeronautics and Space Administration, Washington, D.C.

[21] Appl. No.: 173,520

[22] Filed: Jul. 30, 1980

[51] Int. Cl.[3] .......................... B23B 35/00; B23C 3/00
[52] U.S. Cl. ....................................... 409/131; 125/20; 408/1 R; 408/61
[58] Field of Search ......................... 409/131, 132, 135; 29/557, 558; 408/1, 59, 144, 60, 61; 125/20, 38

[56] References Cited

U.S. PATENT DOCUMENTS 2,010,257  8/1935  Fehse .................................. 408/1 X
2,478,846  8/1949  Smith .................................. 408/59

FOREIGN PATENT DOCUMENTS 49-36375  9/1974  Japan ..................................... 408/1

OTHER PUBLICATIONS

"Tap Magic Cutting Fluids", The Steco Corporation, 2330 Cantrell Rd., Little Rock Ark.

Primary Examiner—Z. R. Bilinsky
Attorney, Agent, or Firm—John O. Tresansky; John R. Manning; Robert E. Bushnell

[57] ABSTRACT

A process for machining glass by placing a rotating carbide working surface under minimum pressure against an area of glass to be worked and concurrently wetting the region between the working surface and the area of glass with a lubricant consisting essentially of a petroleum carrier, a complex mixture of esters and a complex mixture of naturally occurring aromatic oils.

7 Claims, 1 Drawing Figure

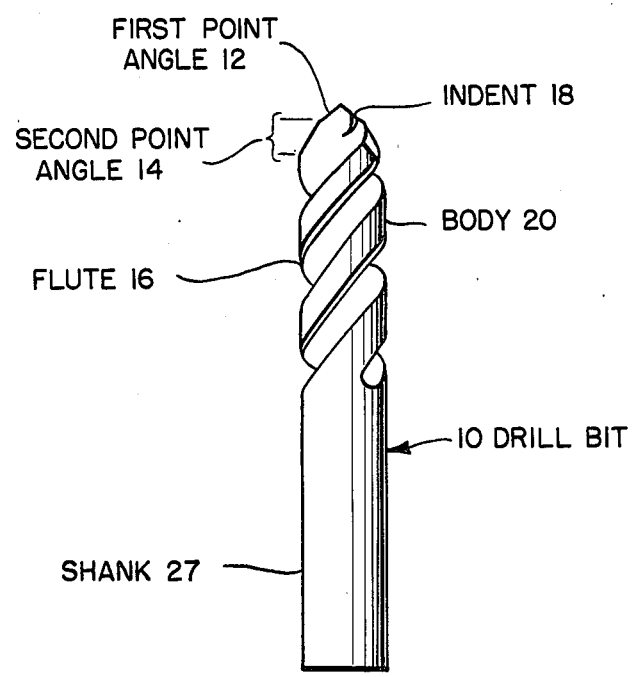

METHOD FOR MILLING AND DRILLING GLASS

ORIGIN OF THE INVENTION

The invention described herein was made by an employee of the United States Government and may be manufactured and used by or for the Government for governmental purposes without the payment of any royalties thereon or therefor.

DESCRIPTION

1. Technical Field

The invention relates to the machining of glass and, more particularly, to a process for milling and drilling glass.

Glass has been defined as a liquid whose rigidity is great enough to enable it to be put to certain useful purposes. Its rigidity, or hardness, however, has limited the suitability of glass for machining, thereby restricted its usefulness. Additionally, when machined, its hardness causes chipping and cracking in regions adjoining the area worked. This characteristic eliminates the possibility of machining glass with any degree of precision except with diamond grinding wheels.

2. Background Art

Currently, there are several methods in use for performing such machining operations on glass as drilling glass sheet stock. The quickest, although perhaps, least accurate, involves little more than directing a low speed projectile, such as a BB size shot discharged from an air gun against the area of glass to be drilled. When viewed from the side of impact, typically the projectile makes a circular hole with a moderately chipped rim. The obverse or exit side, however, is invariably marred by a rough conic crater having a base diameter several times the diameter of the circular hole. Cracking of a large adjoining area is quite common.

A more accurate method commonly practiced by glaziers uses a case hardened ceramic drill bit driven either by a brace or by a slowly turned hand-powered drill. Very little pressure is applied to the drill bit. The working surface of the drill bit is kept wet with a light lubricating oil or, perhaps, turpentine. Once the very tip of the drill bit pierces the glass sheet, the drill is removed and reapplied, again with very little pressure, to the obverse side of the glass sheet and the hole is completed. The inaccuracy or wobble of a hand-powered drill bit limits the possibility of precision and restricts this method to holes larger than one-eight of an inch in diameter.

A more precise and expensive method, practiced mainly in optical instrument shops, uses a hollow core, diamond faced drill bit. While being applied against glass stock, water is forced through the hollow core to cool the region worked and to flush loose glass particles from the hole. However, diamond tool bits have a tendency to mar the walls of a hole with cut patterns and extensively chip the entrance and exit rims. Additionally, the risk of fracture is fairly high. The necessity of a hollow core mandates a lower limit upon the bit diameter of about 0.125 inches.

A lack of precision due to extensive chipping occurring along rims and or machined surfaces is one of the chief disadvantages of these prior art methods. Their unreliability caused by the high risk of fracture during machining, is another disadvantage. Furthermore, the relatively large dimensions of the tools used make these processes unsuitable for performing fine machining details.

STATEMENT OF INVENTION

Accordingly, it is an object of the invention to provide an improved process for machining glass.

Another object is to provide a process for machining glass to close tolerances.

A further object is to provide a process for reliably and cheaply machining glass.

It is still another object to provide a process for machining glass to smaller dimensions than possible with prior art processes.

It is still another object to provide a quick process for machining glass.

It is yet another object to provide a process that reduces the occurrence of fracture during machining of glass.

Yet another object is to provide a process that reduces the extent of chipping along the edges and rims of machined areas of glass.

A further object is to provide a process for making machined regions with smooth wall surfaces in glass.

Briefly, the foregoing and other objects are achieved by a machining process wherein the area of the glass to be worked is subjected to a rotating carbide workpiece placed with a minimum pressure against the area of the glass to be worked and which is being wetted by a lubricant consisting essentially of a petroleum carrier, a complex mixture of esters and a complex mixture of naturally occurring, purified aromatic oils.

BRIEF DESCRIPTION OF THE DRAWING

The invention will be more readily appreciated when considered in conjunction with the accompanying solitary FIGURE wherein a front view of a carbide drill bit is shown.

DETAILED DESCRIPTION OF THE INVENTION

In accordance with the invention, a glass workpiece is mounted on a soft wax layer for uniform support and the wax is allowed to cool before machining begins. A tool with a hard working surface such as tantalum carbide or tungsten carbide, preferably one made of solid carbide, is mounted in a small Jacobs type chuck of a precision type bench drill press or a horizontal milling machine. The working surface of the tool and the surface of the glass to be worked are wetted with a lubricant made of a complex mixture of synthetic esters, a complex mixture of aromatic oils of plant origin arranged with a definite distribution, and a middle molecular weight petroleum distillate carrier. The tool is driven in high speed rotation, preferable at 1,800 or greater revolution per minute, and gently placed against the surface of the glass. While in contact with the glass, the region between the working surface of the tool and the region of the glass worked is kept wet with the lubricant. Little or no pressure is applied to the tool during machining. With the exception of heat generated by the frictional forces of machining, the process is conducted while the glass workpiece is at room temperature. If a deep hole is to be drilled, it is well to periodically raise the tool bit in order to clear the hole of glass dust and particles although blind holes of less than one inch in depth and one-sixteenth inch diameter have been drilled in a single pass. Similarly, if a deep groove is to be milled, it is desirable to make a series of step passes, each 0.005 to 0.010 inches in depth. Generally, it is preferable to drill a pilot hole before such operations as machining a central groove in one face of a glass workpiece.

One type of solid carbide drill bit 10 used with particular success in this process is a "Spacedrill" circuit board drill, size 50, SHCB, manufactured by Space Implements Company of Burbank, Calif. This particular tool is a double fluted drill (i.e., a body 20 wth two flutes 16) ground with two adjoining point angles 12, 14 at the end opposite the drill shank 27. This type of drill bit is shown in the drawing. End mills and all of the other tools used in machining the glass examplars were also commercially available items obtained from a shop tool crib.

The lubricant described in conjunction with the detailed description is manufactured and commercially distributed by Steco Corporation, 3400 Asher Avenue, Little Rock, Ark., under the name of "TAP MAGIC for aluminum."

The general nature of the invention having been set forth, the following illustrative examples are presented as typical embodiments thereof. It will be understood that the invention is not limited to these examples, but is susceptible to various modifications that will be recognized by one of ordinary skill in the arts. The dimensions stated were, where indicated, taken from the tool dimension or obtained by use of shop gauges.

EXAMPLE 1

A glass microscope slide about one sixteenth of an inch thick was coated with a warm layer of red wax and a second, identical microscope slide was placed on top of the wax layer. The two slides were pressed to remove air bubbles from the wax layer between them. When cooled to room temperature, a few drops of TAP MAGIC for aluminum were squirted onto the exposed surface of the top slide. A series of six adjacent 0.018 diameter holes were drilled along a straight line, through both slides. The tool used was a Spacedrill double fluted, circuit board drill with two adjoining point angles. For the first adjacent two holes, wall thickness was about 0.009 of an inch; wall thickness between the penultimate and last holes was about 0.002 of an inch. Both slides were free of fractures. Entry and exit rims of all twelve holes exhibited very little or no chipping. Visual inspection showed the walls of the holes to be of uniform smoothness.

EXAMPLE 2

A near cube of crown glass about two inches to a side was mounted in the manner described in Example 1, on a warm layer of blanchard wax. When cooled, a one half inch wide groove was milled across two-thirds of one face of the cube with a double fluted, solid carbide end mill rotating at about 1800 revolutions per minute. The end mill was periodically wetted with a squirt of TAP MAGIC® for aluminum during milling. Successive passes increased the depth of the groove to seven thirty-seconds of an inch. Visual inspection revealed the rim between the face and walls of the groove to be uniformly finely chipped to the extent of creating an extremely fine level along the rim. The walls were uniformly smooth. The base or floor of the groove contained periodic occlusions. The rim, walls and floor of the groove felt smooth to a firm touch of the finger. A jobe block 0.001 of an inch thicker than the diameter of the end mill could not be inserted into the groove.

The detailed description refers to glass generally. The process disclosed is known to work with plate glass, window glass, Pyrex glass, crown glass, Cervit glass, and Zerodur glass.

The foregoing detailed discussion describes a room temperature process for machining glass to precision tolerances. The tools used are commercially available and have a hardness greater than that of the glass machined, but not as great as the diamond faced tools previously used. At least one formulation of the lubricant is also commercially available. Generally, it is best to keep the region between the working surface of the tool and the worked surface of the glass wet with the lubricant during a machining operation by periodically squirting a small quantity of lubricant at the region to replenish lubricant displaced by the region by the tool and absorbed by glass dust. In lieu of intermittent application of the lubricant, a continuous stream of lubricant may be directed at the region worked. In comparison with the dimensions of machined regions, the extent of chipping along edges and rims is invariably negligible. Additionally, this process allows machining of adjacent regions separated by as little as 0.002 inches of wall thickness. Typical applications for this process include drilling mounting bolt holes in curved Cervit mirror blanks, drilling feed-through sensor instrument holes in fiber optic bundles, and milling precision grooves in blocks of crown glass.

What is claimed and desired to be secured by issue of a Letters Patent of the United States, is:

1. A process for machining glass, comprising the steps of:
   placing a carbide working surface of a solid tool against an area of a glass workpiece;
   wetting the working surface with a lubricant consisting essentially of a middle molecular weight petroleum distillate carrier, a complex mixture of esters, and a complex mixture of naturally occurring aromatic oils; and
   driving said wetted working surface with continuous motion and minimal pressure against said glass workpiece area.

2. A process for machining glass, comprising the steps of:
   placing a rotating carbide working surface subject to minimum pressure against an area of glass to be worked;
   wetting the region between the working surface and the area to be worked with a lubricant consisting essentially of a mixture of a middle molecular weight petroleum distillate, a complex mixture of synthetic esters, and a complex mixture of natural occurring, purified aromatic oils.

3. The process set forth in claims 1 or 2, wherein said carbide working surface is a double fluted drill ground with a plurality of adjoining point angles.

4. The process set forth in claims 1 or 2 wherein said working surface is driven at a speed on the order of hundreds of motions per minute.

5. The process set forth in claim 3 wherein the drill has a diameter between 0.125 and 0.018 inches.

6. A process for machining glass, comprising the steps of:
   driving a tool having a working surface of a material exhibiting a hardness greater than glass with continuous motion and minimal pressure against a glass workpiece; and wetting the region between said working surface and said glass workpiece with a liquid phase lubricant consisting essentially of a complex mixture of synthetic esters, a complex mixture of purified aromatic oils of plant origin arranged with a definite distribution, and a middle molecular weight petroleum distillate carrier.

7. The process of claim 6 wherein said tool is solid.

* * * * *